April 5, 1966  W. A. FOLSOM  3,244,977
ELECTRONIC GAGING DEVICE WITH LINEAR OUTPUT CHARACTERISTICS
UTILIZING A SERIES NETWORK OF DIODES AS PART OF
THE METERING CIRCUIT Filed March 6, 1962  2 Sheets-Sheet 1

INVENTOR
WILLIAM A. FOLSOM
BY Leonard H. King
ATTORNEY

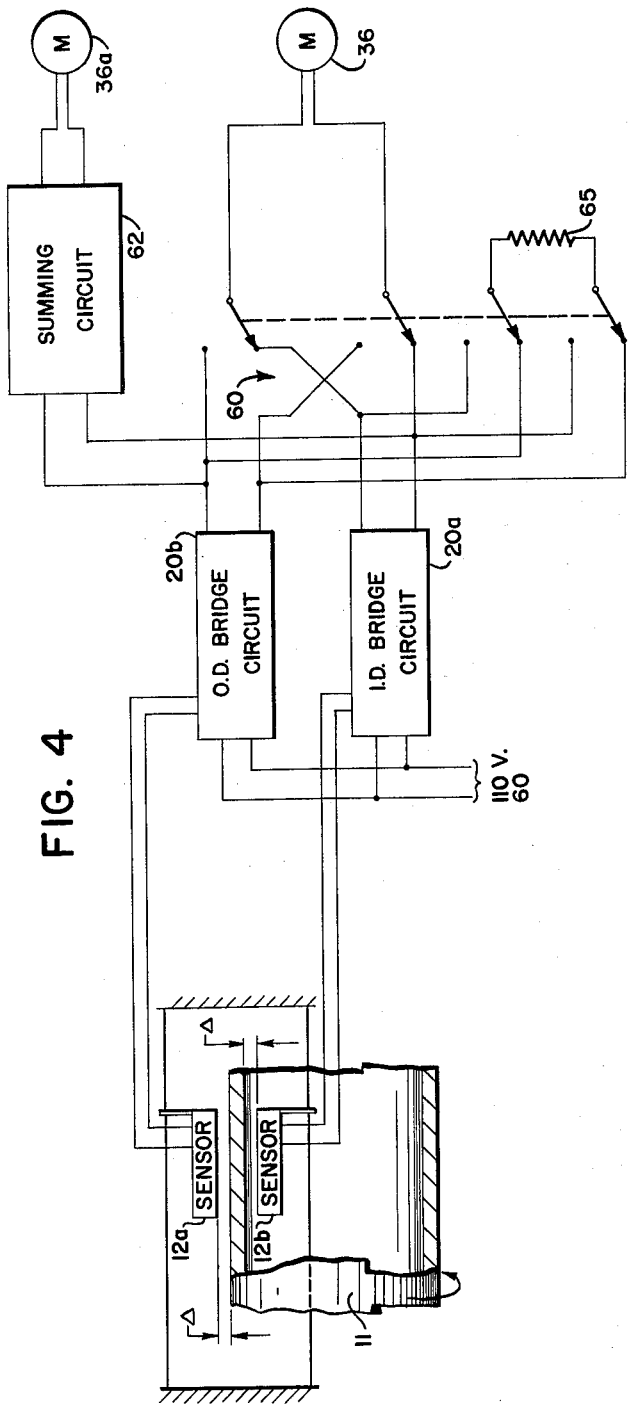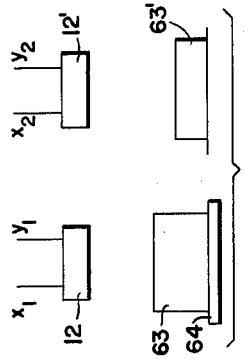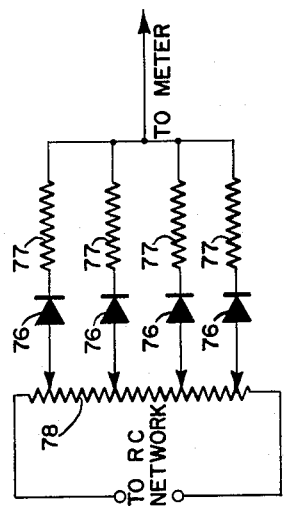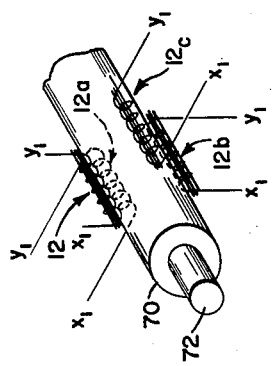
FIG. 4
FIG. 5
FIG. 6
FIG. 7
INVENTOR
WILLIAM A. FOLSOM
BY Leonard H. King
ATTORNEY

United States Patent Office 3,244,977
Patented Apr. 5, 1966

1

3,244,977
ELECTRONIC GAGING DEVICE WITH LINEAR OUTPUT CHARACTERISTICS UTILIZING A SERIES NETWORK OF DIODES AS PART OF THE METERING CIRCUIT
William A. Folsom, 444 2nd St., Schenectady, N.Y.
Filed Mar. 6, 1962, Ser. No. 177,792
6 Claims. (Cl. 324—57)

This invention relates to precision electronic measuring means. The device of this invention may be employed for a variety of tasks as, for example, the precise measurement of the gap between a sensor and a metallic object. Typically, it may be employed to measure the run-out of gun barrels and the thickness of non-metallic members.

While many devices have heretofore been proposed and have indeed been successfully employed for such purposes, their high cost, need for critical adjustment, and susceptibility to environmental conditions have limited their employment. The device of the present invention overcomes these limitations, as will be explained more fully hereinafter.

The utility of the device is clearly shown by its use as a means for measuring the run-out of the bore of gun barrels during the forging of the barrel. Run-out is defined as the variation of the radius of rotation of the barrel with respect to the axis of rotation.

Briefly dsecribed, as embodied in a run-out measuring device, a variable reactance sensor is suspended from a simple taut trolley wire running axially through the bore and supported at its ends at fixed stations. The metal barrel under consideration is rotated and the deviation in location of the inner wall relative to the sensor is displayed on a suitable indicating means. The sensor may be drawn through the bore on the trolley wire so that a point-to-point check of the barrel may be made. It will be appreciated that the supporting means is surprisingly simple and that no cumbersome or costly supports are employed. Many contemporary measuring devices could not fit within a long bore of say, but three inches in diameter. Thus, a feature of the invention is the provision of a measuring system employing simple and inexpensive sensor supporting means.

As will be brought out more fully hereinafter, a feature of the invention is the novel circuitry which provides an output signal which is linear over a wide range and which is simple and stable. The circuit of this invention does not rely, for example, on the use of costly non-linear potentiometers or amplifiers.

A further object is to provide an electronic gaging device not requiring amplification means.

Another object is to provide an improved impedance bridge.

A further object is to provide an improved A.C. impedance measuring bridge having a linear D.C. output.

A particular object is to provide an improved bridge circuit operating in conjunction with a sensing means providing a non-linear response with reference to a condition being sensed wherein said bridge circuit has an unbalance current whose magnitude is directly related to the condition being sensed.

These and still other objects, features and advantages will, in part, be pointed out with particularity and will, in part, be obvious from consideration of the following description taken in conjunction with the accompanying drawings.

In the drawings:
FIG. 1 is a schematic diagram of the apparatus of this invention as applied to the measurement of run-out of a rotating barrel.

FIG. 2 is a plot of bridge unbalance voltage versus distance of sensor to metal member.

2

FIG. 4 is a schematic diagram of the invention employed in measuring the variation of thickness of a metallic member.

FIG. 5 shows in an elevational view an arrangement for comparing with a standard the height of objects passing a monitoring point on a conveyor.

FIG. 6 is a perspective showing of an arrangement for measuring the thickness of a dielectric coating on a wire.

FIG. 7 is a schematic showing of an alternative diode circuit.

Figure 1:
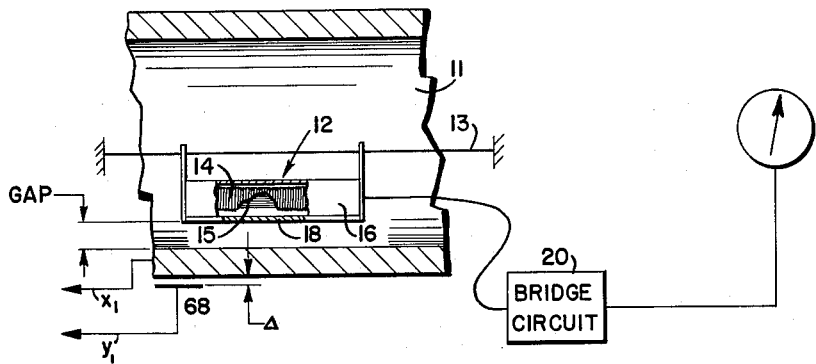

A typical application according to the invention is shown in FIG. 1. A gun barrel 11 rotates about its major axis. A reactance-type sensing element 12 is suspended from a trolley wire 13 above the inner wall of the barrel. The sensor is a cylindrically wound coil 14 provided with a magnetizable straight core. In one embodiment, 1500 turns of #27 wire on a 9/16" x 9/16" high permeability iron core 15 Microsil® as supplied by Magnetic Materials, Inc., Camden, N.J., was employed. The coil is housed in an inverted U-shaped aluminum sheet shield 16 provided with a stainless steel bottom plate 18. The coil is mounted with its major axis substantially parallel to the surface under investigation. It is to be noted that the accuracy of the instrument is not dependent on the precise orientation of the coil with respect to whether one end is higher or lower or sideways with respect to the axis.

Figure 3:
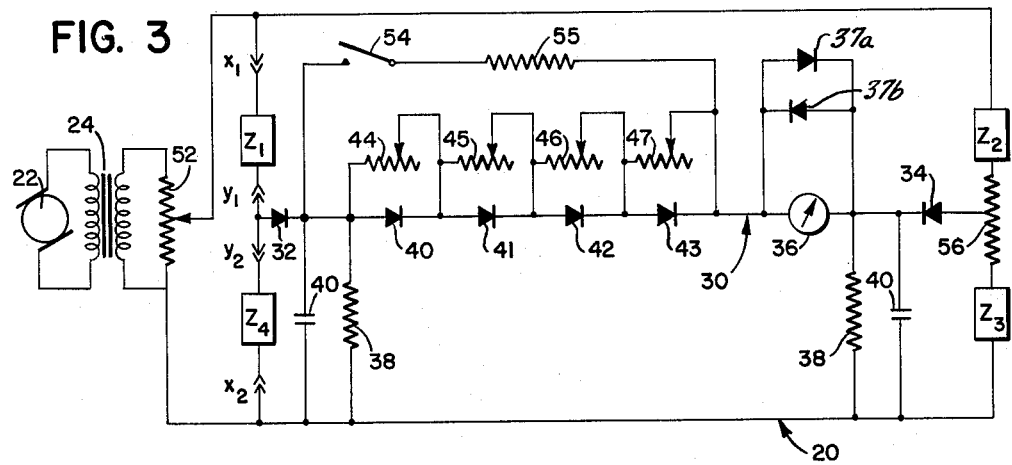
FIG. 3 is a schematic diagram showing the improved bridge circuit of the present invention.

The sensor 12 forms one arm of bridge 20 (FIG. 3). The bridge is energized from a regulated nominal 115 v. A.C. source 22 through step-down transformer 24, having a 37 v. output in one model. For the application under discussion, a 60-cycle source is suitable although as will be explained hereinafter, a higher frequency may be desired for other modes of operation.

As the gap between the sensor coil 14 and the metal surface is increased, the inductance and therefore the reactance of the sensor changes.

If the member being monitored is composed of a magnetizable material, such as a magnetizable steel, then a change of reluctance through the air gap to the magnetic conducting steel path occurs. In this case, the inductance of the coil decreases as the air gap increases.

On the other hand, if the member is composed of a non-magnetic conductive material such as copper, aluminum, stainless steel, etc., eddy currents will be set up in the body of the member by the field generated by the alternating current in the coil.

As a result there will be an increase of inductance with an increase in gap between the sensor and the member. In the eddy current mode of operation, a higher frequency A.C. source, say 10 kc./sec., is preferred.

Referring to FIG. 3, it will be seen that the bridge is formed by four arms $Z_1$, $Z_2$, $Z_3$ and $Z_4$. $Z_1$ is the sensor coil 14; $Z_2$ and $Z_3$ are most conveniently resistive members although inductors or capacitors may be employed. $Z_4$ may be a coil like sensor coil 14. The coil serving as arm $Z_4$ is mounted in a stationary position with respect to a metal surface. Instead of using a coil, a resistor of similar impedance to that of the coil may be substituted. The use of a "dummy coil" is preferred in that the bridge is not subject to unbalance resulting from self-heating of the resistor.

A metering circuit 30 connected to the conjugal diagonal of the bridge senses the unbalance bridge current. The metering circuit includes opposed rectifiers 32 and 34 deployed on opposite sides of D.C. galvanometer meter 36. Associated with each of the rectifiers, there is provided a resistor 38 and a capacitor 40 which comprise an R-C filter network. The meter 36 may be replaced by other current responsive means without departing from the spirit of the invention.

Figure 2:
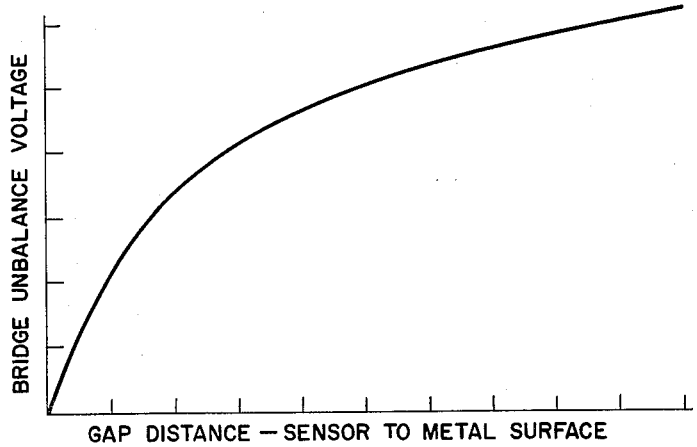

As shown in FIG. 2, the normal variation of unbalance voltage with variation in gap between the sensor and metal member is non-linear. In order to provide a linear readout, prior devices have employed such costly arrangements as non-linear potentiometers in self-balancing bridge systems. On the other hand, the present invention employs a series network of diodes 40, 41, 42, 43, poled in a like direction in series with meter 36. In parallel with each of the diodes there is provided a variable trimming resistor identified by reference numerals 44, 45, 46 and 47, respectively. A suitable diode for this purpose is the type IN536, as supplied by the General Electric Co. It is to be noted that this is an example of a suitable circuit. If other diodes are substituted or other ranges are indicated than a greater or lesser number of diodes may be employed. The diode should be operated in its non-linear voltage-current characteristic region.

For calibration, the sensor is supported on non-magnetic, non-metallic gage blocks of say, 1″ height. The zero position is set by closing switch 54 placing resistor 55 in parallel with the series string of diodes 40, 41, 42 and 43, and then adjusting potentiometer 56. Potentiometer 52 is then adjusted until the pointer of meter 36 coincides with the 1″ calibration. The gage blocks are replaced by 0.8″ blocks and trimmer 47 is adjusted until the pointer coincides with the 0.8″ marker. This procedure is repeated with trimmers 46, 45 and 44 for the 0.4″, 0.2″ and 0.1″ positions. The procedure is repeated for final adjustment of the calibration.

To eliminate varying magnetic leakage effects, depending on the size of the bore in which the sensor is being used, magnetic shields can be placed over the top and sides of the sensor. While this reduces the unbalance output of the bridge or its sensitivity, it does result in an output curve of uniform shape regardless of the bore size in which the sensor is being used. This means that the linearizing circuit (combination of linear and non-linear elements) does not have to be readjusted if the equipment is transferred to a bore of another size. The magnetic shields may be of magnetizable steel. They may also be made of highly conductive metal in which eddy currents may be generated so as to block the passage of the magnetic field.

The invention may be used to measure the variation in thickness of a member, as shown in FIG. 4. Two sensors 12a and 12b, and associated bridge circuits 20a and 20b, are employed. One sensor is supported outside barrel 11 and the other inside barrel 11 opposite the first. Since the output of each bridge is proportional to the gap between its associated sensor and the barrel, the sum of the two indicated gaps will remain constant unless the wall thickness varies. Accordingly, the variation of the sum of the two outputs is directly proportional to thickness variation. The two outputs are summed in summing circuit 62 and the output read on meter 36a.

The sensors 12a and 12b, connected respectively to I.D. bridge circuit 20a and O.D. bridge circuit 20b, are maintained stationary on their supporting cables during the measurement. Sensor 12b is counterweighted to remain in an upside down position. A feature of this design is that the accuracy of the instrument is uniform over a wide range and it is not a function of the thickness of the metallic member under observation. It is of particular note that radial movement of the object between sensors will not affect the measurement.

A switch 60 is provided for selectively connecting the inside diameter (I.D.) or outside diameter (O.D.) bridge circuits 20a and 20b respectively, to meter 36. This feature is greatly advantageous for measuring run-out of I.D. or O.D. due to a bent barrel. Obviously, separate meters can be provided if for a particular installation, the added cost is warranted. Dummy resistor 65 is substituted for the meter in the unselected circuit.

Since the gage measures the gap over an area roughly equal to the area of the sensor, small holes or irregularities in the metal surface will not affect the run-out indication.

There are many other applications for the device of this invention. For example, it may be employed to measure the run-out of a rapidly rotating shaft or flat plate located in a lathe chuck. Since the run-out of a rapidly rotating member appears as a pulsating D.C. signal, it is necessary to detect the A.C. component by conventional techniques and indicate its magnitude.

As shown in FIG. 5, a sensor 12 may be positioned over a conveyor 64 to measure the height of a metal object 63. In this instance, a like "standard" article 63′ is positioned proximate to a second sensor 12′ which is tied into the bridge (FIG. 2) at point $X_2-Y_2$ as arm $Z_4$. Thus, a deviation from the standard will be noted on the meter 36. The meter 36 may be replaced by one of the max-min relay type wherein any deviation beyond a preset range will result in closing of a relay for actuating an alarm or control means. Such modifications are standard industrial practice and need not be discussed at length herein. Likewise, the meter may be replaced by or employed together wth a synchrotransmission for remote indication.

Referring again to FIG. 1, there is shown a capacitive probe 68 connected to bridge circuit 20 in lieu of the inductive probe. In this instance, a capacitor should be used in arm $Z_4$, probe 68 serves as arm $Z_1$.

Thus, there has been provided a simple, accurate non-contacting device, free of moving parts (other than the indicator) and which does not require amplification means.

The device may be employed in an eddy current mode for measuring the thickness of non-metallic material. In this mode a relatively high frequency power source is preferred. As shown in FIG. 6, the inductive sensor 12 is positioned against the insulation 70 covering wire 72. As the wire is drawn longitudinally past the sensor coil and if the thickness of the insulation varies, the gap between the coil and the wire 72 varies. In turn, this affects the magnitude of the eddy currents induced in the wire by the field surrounding the coil and in turn, the inductance of the coil. In the case of a 360° coating, additional sensors 12a, 12b, 12c, etc., at say 90° intervals, connected to separate bridges or the same bridge by multiplexing techniques, is preferred.

The axial location of the sensor in the barrel may be determined by conventional means and does not form part of the instant invention.

It is to be noted that the preceding discussion has been directed primarily to the detection of the change in gap. By fixing the sensors against movement and calibrating the instrument, the device may be used for the measurement of absolute values of thickness.

It is to be noted that a single variable trimmer resistor, such as resistors 44–47, may be employed in parallel with more than one diode, albeit some minor degradation of trimming capability.

In FIG. 7, an alternative diode linearity circuit is shown in which the diodes 76 and isolating resistor 77 are connected in parallel to an adjustable tap voltage divider 78. As the unbalance voltage increases, the diodes become conductive in sequence. The tap positions may be adjusted in a fashion similar to the adjustment of the trimming resistors in the embodiment discussed earlier.

Having thus disclosed the best embodiment of the invention presently contemplated, I wish it understood that various changes and modifications may be made without departing from the spirit of the invention.

What is claimed is:

1. Measuring means whose reactance is affected by the presence of external metallic members within its field of influence comprising:

reactance pick-up means for providing a signal indicative of the spacing between said pick-up means and a spaced metallic member within its field of influence;

a bridge having first, second, and third impedance means connected in series with said reactance pick-up means to form a loop having two pairs of opposed junctions;

a regulated A.C. source connected to a first said pair of opposed junctions;

an unbalance current metering circuit connected between the other said pair of opposed junctions, said unbalance circuit including:

current responsive means;

a pair of rectifier means arranged in oppositely poled relationship, one of said pair being connected in series with a different side of said current responsive means in said metering circuit;

a first two-terminal R.C. filtering network having one terminal connected between a point of said metering circuit common to a said rectifier means and said current responsive means and the other terminal connected to said A.C. source; and a second two-terminal R.C. filtering network having one terminal connected between a point of said metering circuit common to the other said rectifier means and said current responsive means and the other terminal connected to the said A.C. source;

a plurality of series connected, like poled diodes arranged to operate in their nonlinear characteristic region connected between one of said rectifier means and said current responsive means, and a variable resistance device connected in parallel with each of said diodes.

2. The apparatus of claim 1 wherein said A.C. voltage source includes amplitude adjustment means.

3. The apparatus of claim 1 wherein means are provided for bypassing said diodes in said metering circuit.

4. The apparatus of claim 1 wherein said reactance pick-up means is an inductance coil.

5. The apparatus of claim 1 wherein said first and said second impedances are resistors.

6. The apparatus of claim 1 wherein said reactance pick-up means is a capacitive probe.

References Cited by the Examiner
UNITED STATES PATENTS

| | | | |
|---|---|---|---|
| 2,492,901 | 12/1949 | Sweet | 324—132 X |
| 2,537,731 | 1/1951 | Angell | 324—34 |
| 2,567,700 | 9/1951 | Ehlschlager | 324—57 |
| 2,593,175 | 4/1952 | Packard et al. | 324—57 |
| 2,728,042 | 12/1955 | Ruhland | 324—119 X |
| 2,768,684 | 10/1956 | Castel et al. | 324—34 |
| 2,810,107 | 10/1957 | Sauber | 324—132 |
| 3,012,192 | 12/1961 | Lion | 324—57 |
| 3,060,377 | 10/1962 | Schmidt | 324—34 |

FOREIGN PATENTS

| | | |
|---|---|---|
| 337,907 | 11/1930 | Great Britain. |
| 475,687 | 11/1937 | Great Britain. |

WALTER L. CARLSON, *Primary Examiner.*